United States Patent [19]

Dodge

[11] Patent Number: 4,609,288

[45] Date of Patent: Sep. 2, 1986

[54] DIRECT RAY SOLAR METER AND METHOD

[76] Inventor: Robert J. Dodge, Box 19781, Houston, Tex. 77224

[21] Appl. No.: 498,534

[22] Filed: May 26, 1983

[51] Int. Cl.$^4$ .............................................. G01J 1/42
[52] U.S. Cl. .................................... 356/218; 356/222
[58] Field of Search ............... 356/213, 214, 215, 216, 356/217, 218, 219, 220, 221, 222, 225; 250/203 S, 237 R; 126/424, 425

[56] References Cited

U.S. PATENT DOCUMENTS

| | | | |
|---|---|---|---|
| 1,546,264 | 7/1925 | Story | 356/218 |
| 2,913,583 | 11/1959 | Regnier et al. | 250/203 |
| 3,891,326 | 6/1975 | Volz | 356/222 |
| 4,008,391 | 2/1977 | Henderson | 356/121 X |
| 4,110,049 | 8/1978 | Younskevicius | 356/222 |
| 4,179,612 | 12/1979 | Smith | 250/203 R |
| 4,225,781 | 9/1980 | Hammons | 250/203 |
| 4,316,084 | 2/1982 | Stout | 250/203 |

OTHER PUBLICATIONS

"Evaluation of Spatial Illuminance in Buildings", Bansal et al, Energy and Buildings, 8-1979, pp. 179-184.
"A Sunshine Monitor with Electrical Output and without Moving Parts", Thornblad, Journal of Physics E., vol. 8, No. 9, 6-1975, pp. 481-486.

Primary Examiner—Vincent P. McGraw
Assistant Examiner—S. A. Turner
Attorney, Agent, or Firm—Hubbard, Thurman, Turner & Tucker

[57] ABSTRACT

Six silicon solar cells are arranged in three pairs on three mutually perpendicular planes. One cell of each pair will be exposed to both the direct rays of the sun and the diffuse light radiation incident from the same direction, depending upon the orientation of the device and the time of day. The other cells of each pair will be exposed only to the diffuse radiation on their respective planes. The differences in the measured radiation on each plane are squared, summed, and the square root of the sum then taken to determine the actual value of the direct rays of the sun.

10 Claims, 6 Drawing Figures

DIRECT RAY SOLAR METER AND METHOD

BACKGROUND OF THE INVENTION

The present invention relates to the measurement of radiation, especially visible radiation. More particularly, the present invention relates to a system and method for measuring the intensity of sunlight.

It is of interest to many branches of science and engineering to know the value of the intensity of the sun's direct rays. Instruments well known for measuring the sun's radiation include the calibrated silicon cell, the pyranometer, and the pyrheliometer. The pyranometer and the silicon cell have rather large angles of acceptance, and so respond to both the diffuse radiation incident thereon, and to the direct rays of the sun times the cosine of the angle of incidence. To determine the intensity of the direct rays only, these instruments are then oriented in a direction normal to the direct rays, and a reading is obtained. Another reading of just the diffuse radiation, as by shadowing the instrument, is also obtained. The latter is then subtracted from the former.

The pyrheliometer has a much smaller acceptance angle and so excludes substantially all of the diffuse radiation. It can therefore give a direct reading when aimed directly at the sun.

In all these cases, however, a measurement must be made in which the instrument is oriented so that it is normal to the sun's direct rays. For mulitiple and/or continuous measurements, therefore, constant tracking of the sun is required.

A need thus remains for a method and apparatus which can accurately measure the value of the intensity of the direct rays of the sun without requiring tracking. Such a device and method would preferably employ a minimum of parts, have no moving parts, and require no power for tracking. Advantageously, this would provide for a rugged, inexpensive, reliable device suitable for extended, unattended use, as in remote sites where tracking power would be unavailable.

SUMMARY OF THE INVENTION

Briefly, the present invention meets the above needs and purposes with a method and apparatus for measuring the intensity of the direct rays of the sun, in which no moving parts are required. Accurate values are thus obtained without the necessity and complications of tracking the sun.

To this end, in the preferred embodiment of the present invention three pairs of photocells are arranged relative to three mutually perpendicular planes. The cells are of the usual silicon cell type used to provide electrical power for space, theoretical, and other known applications. They are employed in an electrically shunted mode where the electric current produced is directly proportional to the intensity of the radiation incident thereupon. Two of the planes are preferably perpendicular to the earth's surface at the location of the measurement, and the two pairs of cells associated therewith face oppositely in these two planes to measure the light incident upon each side of these planes.

The third pair of cells is arranged so that one of the cells measures the total light downwardly incident upon the third plane, which is substantially parallel to the earth's surface, and the other cell measures only the diffuse radiation incident upon this plane. This measurement is unlike the measurements made by the first two pairs of cells. In those measurements one of the cells in each pair will be exposed to both direct and diffuse radiation (since the sun will understandably shine on one side or the other of each plane), and the other cell will be exposed to diffuse radiation only, coming from the opposite direction. But the back or bottom side of the third plane faces the earth, from which a realistic reading of the diffuse radiation in the vertical direction cannot be expected. Thus the measurement of the diffuse radiation for this plane is also made in a generally upward direction, usually by shadowing the other or second cell of the third pair.

Next the differences of the values of the respective pairs of measurements are determined. This is conveniently done simply by connecting each pair in opposition, so that their voltages are automatically subtracted. These difference values are then squared and summed, and the square root of the sum is determined. The result is the actual value of the direct rays of the sun.

It is therefore an object of the present invention to provide an improved method and apparatus for measuring the direct rays of the sun; to provide such a method and apparatus which can accurately measure the value of the intensity of the direct rays of the sun without requiring tracking; in which one set of measurements is made of the total direct and diffuse light energy incident on each of at least two planes substantially perpendicular to one another, and another set is made of the diffuse light energy only which is incident upon those planes; in which the values of the differences of the respective measurements made on each of the planes are then determined; in which the value of the direct rays of the sun is then determined by determining the square root of the sum of the squares of the difference values; in which suitable apparatus is provided for making these measurements and determinations; and to accomplish the above objects and purposes in an uncomplicated, inexpensive, durable, rugged and reliable device and method employing a minimum of parts, none of which need be moving parts, and thus requiring no power for tracking.

Other objects and advantages of the invention will be apparent from the following description, the accompanying drawings and the appended claims.

DESCRIPTION OF THE PREFERRED EMBODIMENTS

Figure 1:
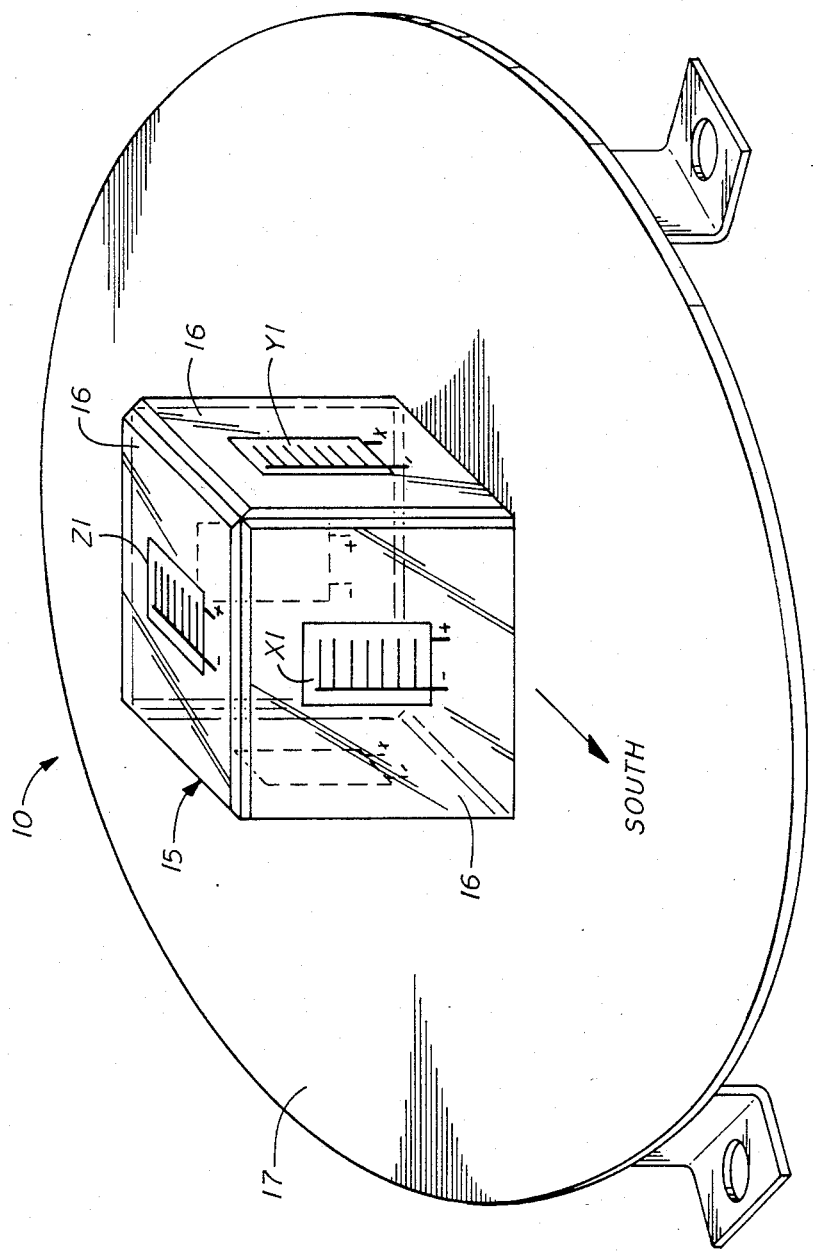
FIG. 1 is a somewhat figurative illustration showing in perspective a preferred embodiment of the direct ray solar meter.

With reference to the drawings, the new and improved direct ray solar meter for measuring the intensity of the direct rays of the sun, and the method therefor according to the present invention, will now be described. FIG. 1 shows somewhat schematically a preferred embodiment 10 of the present invention. Although instrument 10 may be oriented in many different directions, and used at any latitude or longitude, it will be described as if used in the northern hemisphere and oriented facing south. In the southern hemisphere, of course, the following description would simply be reversed.

Figure 2:
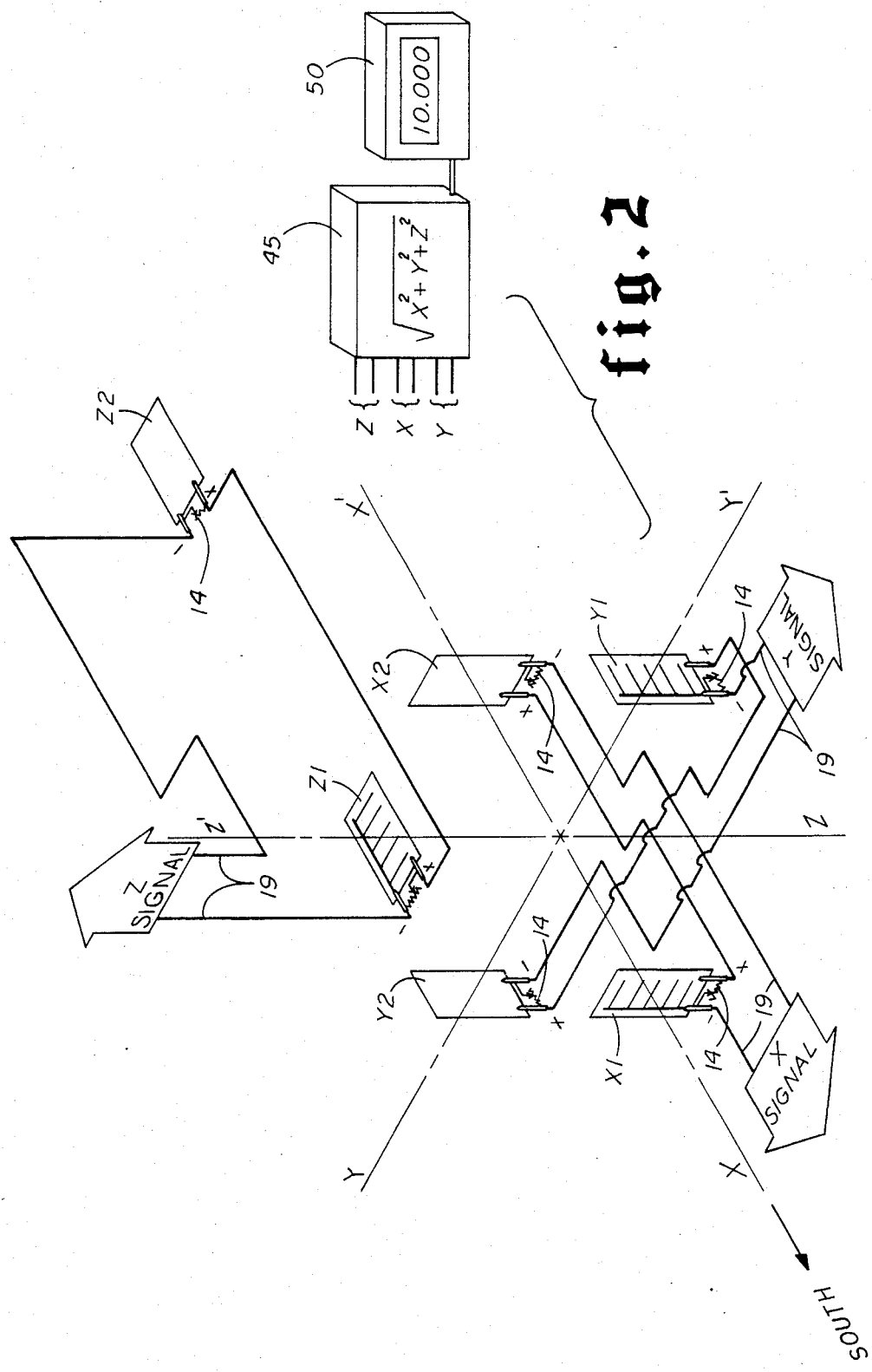
FIG. 2 is a schematic illustration showing the connections, the geometric relations, and the arrangement of the basic components of the solar meter embodiment shown in FIG. 1.

Referring to FIGS. 1 and 2, six photocells, denominated X1, X2, Y1, Y2, Z1, and Z2 can be seen. These are arranged in pairs associated, respectively, with mutually perpendicular planes defined by the X, Y, and Z axes, as illustrated. Cell X1 is thus mounted vertically facing south. Cell X2 is mounted vertically facing north. Cell Y1 is mounted vertically facing east. Cell Y2 is mounted vertically facing west. Cell Z1 is mounted horizontally facing up. Cell Z2 is situated for exposure to portions of the sky from which the sun does not shine while the direct rays of the sun are being measured, as will be further described below.

The cells are of the usual silicon cell type used to provide electrical power for space, theoretical, and other known applications. They are employed in an electrically shunted mode where the electric current produced is directly proportional to the intensity of the radiation incident thereupon. They are shunted with adjustable resistors 14 which are adjusted so that each cell produces the same voltage across its respective resistor 14 when subjected or exposed to the same intensity of radiation.

As shown in FIG. 1, the cells may be arranged in a cube 15. The cube may be made of transparent glass or plastic material 16, such as acrylic. The cells are then mounted behind the material, which acts as a protective cover for the cells. These, in turn, are supported upon a plate 17.

Each of the pairs of cells, that is, the X-pair, the Y-pair, and the Z-pair, is electrically interconnected so that the voltage produced across their respective resistors 14 is subtracted, as shown in FIG. 2. For example, they are each shown with the positive, or plus, terminals of each pair connected to one another, and the output signals (indicated by the x, y, and z arrows) on output wires 19x, 19y, and 19z being connected to the negative, or minus, terminals of each pair. Thus if any pair of the cells, such as the X-pair, were subjected to the same intensity of light on each cell, the output signal on its wires 19 would be zero.

Since the cells of the X-pair face oppositely, as do also the cells of the Y-pair, it will readily be seen that when one cell of one of the pairs is exposed or subjected to the direct rays of the sun, the other will be shadowed. Thus the shadowed cell will give an excellent measurement of the diffuse light incident upon its plane, while the cell directly exposed to the sun will measure both the diffuse light and the direct solar radiation incident on that plane.

Figure 3:
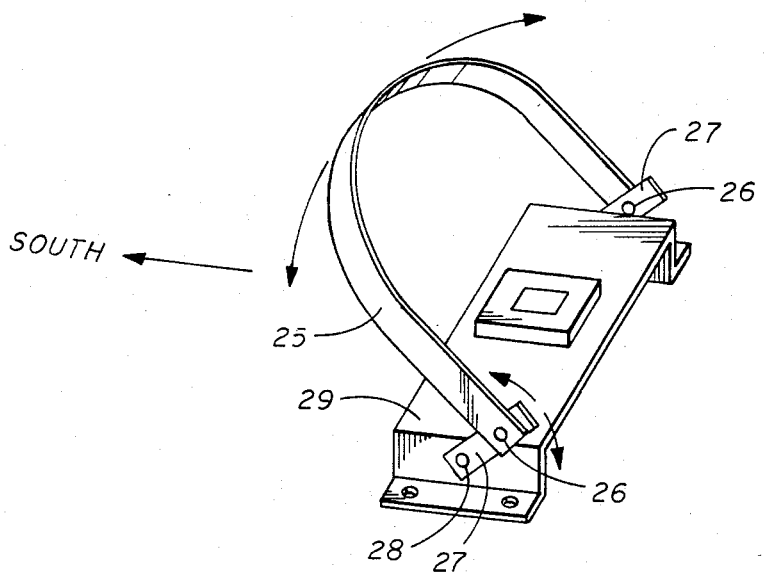
FIG. 3 illustrates a shadow band used for determining the diffuse radiation incident on the horizontally oriented plane.

With regard to the Z-pair, it is preferred to select one of the cells, such as cell Z2, for always measuring only the diffuse radiation incident upon its plane. This may be accomplished, for example, by using an angularly adjustable arc-shaped shadow band 25, such as shown in FIG. 3. Band 25 is hinged at 26 for adjusting its angle over cell Z2 to an angle with respect to the horizontal which is equal to the sun's altitude at noon at the location where the measurement is being made. The band may also have adjustable side arms 27, hinged at 28 to a base 29, for moving the band 25 in a north-south direction to shadow the cell from the rising and setting sun as the sun's azimuth angle changes with the seasons and with the latitude of the measurement. Band 25 thus continuously shadows cell Z2 from the sun as its apparent path moves from east to west, so that the cell is effectively exposed only to portions of the sky from which the sun does not shine during the times that the measurements of the direct rays of the sun are being made.

Figure 4:
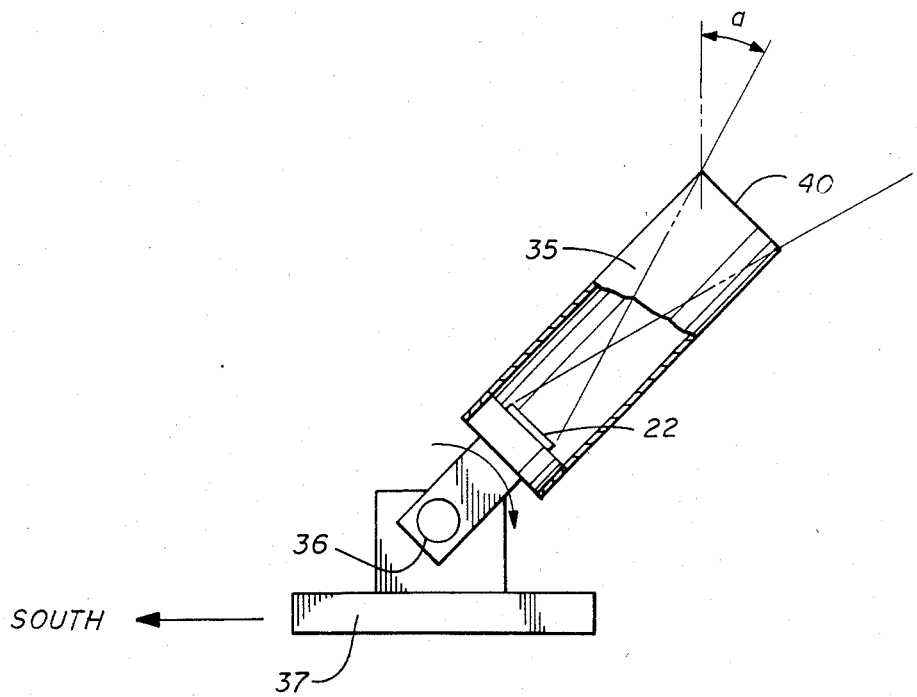
FIG. 4 shows a tube used in a preferred embodiment for determining the diffuse radiation incident on the horizontally oriented plane.

FIG. 4 illustrates another way to arrange cell Z2 to intercept a portion of the sky devoid of direct rays from the sun. Here tube 35, blackened on its interior, is hinged at 36 to a base 37 so that the open end 40 of tube 35 can be pointed toward a portion of the sky from which the sun does not shine during the times that the measurements of the direct rays of the sun are being made. Cell Z2 will be located within tube 35 facing toward the open end 40 thereof, as shown. Preferably, angle a will always be more than 23°, or the sun's declination at the location where the measurements are being made. This embodiment is preferred, since tube 35 does not require the periodic (seasonal) adjustment required by shadow band 25. The sensitivity of cell Z2, when used in tube 35, can be adjusted to account for the fact that only a portion of the diffuse radiation from the sky is viewed (and assuming that the diffuse radiation is roughly uniform).

Returning to FIGS. 1 and 2, it can be seen that with the sun shining upon this arrangement of the three pairs of cells, the illuminated cells will provide a voltage proportional to the direct rays times the cosine of the angle of incidence thereof upon the surface of the cells, plus an amount generated by the diffuse radiation. The shadowed cells will produce a voltage proportional to the diffuse radiation only. Since the cell voltages of the pairs of cells are arranged to subtract, the resultant voltages are the results of the direct rays only times the respective cosines of the angles of incidence of the sun's rays with respect to the surfaces, and hence the respective planes, thereof.

It can be shown by straightforward geometric analysis that the vector of the direct ray can be resolved into three vectors in the x, y, and z planes. It can be further shown that these x, y, and z vectors are equal to the direct vector times the cosine of the angle of incidence between the direct ray and the respective surfaces. See, for example, "The Engineers Companion" by Mott Souders (John Wiley & Sons, Inc., August 1967) at page 25. Further, it is also true that the value of the direct ray is equal to the square root of the sum of the squares of the values of the x, y, and z vectors.

Therefore, to obtain the value of the direct ray, the net difference values of the x, y, and z signals are respectively squared, added, and then the square root of this sum is obtained. This function could be done, for example, with a digital calculator 45 (FIG. 2) having a rapidly updated numerical display, such as a digital voltmeter 50.

The horizontal plate 17 in FIG. 1 serves as a mounting plate with the cube 15 centered thereon. The surface of plate 17 is preferably painted a flat black to minimize reflection from its surface. The plate dimensions are much larger than the cube to help control such reflections.

Figure 5:
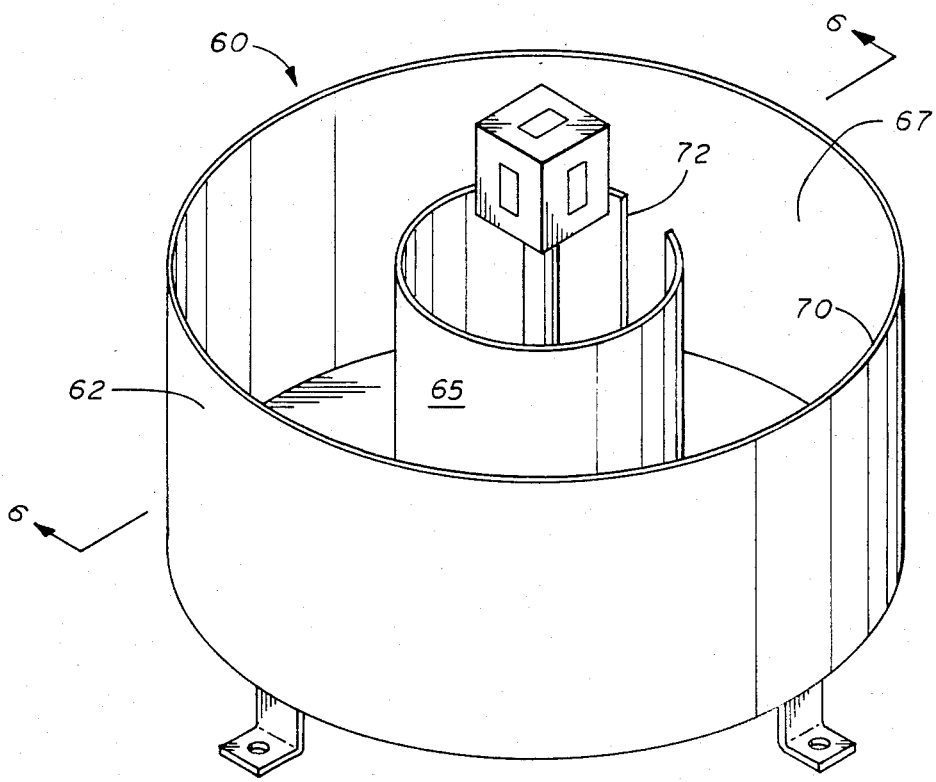
FIG. 5 shows the present invention in conjunction with a walled enclosure which baffles, blocks, and traps reflected light before it can reach the meter.
Figure 6:
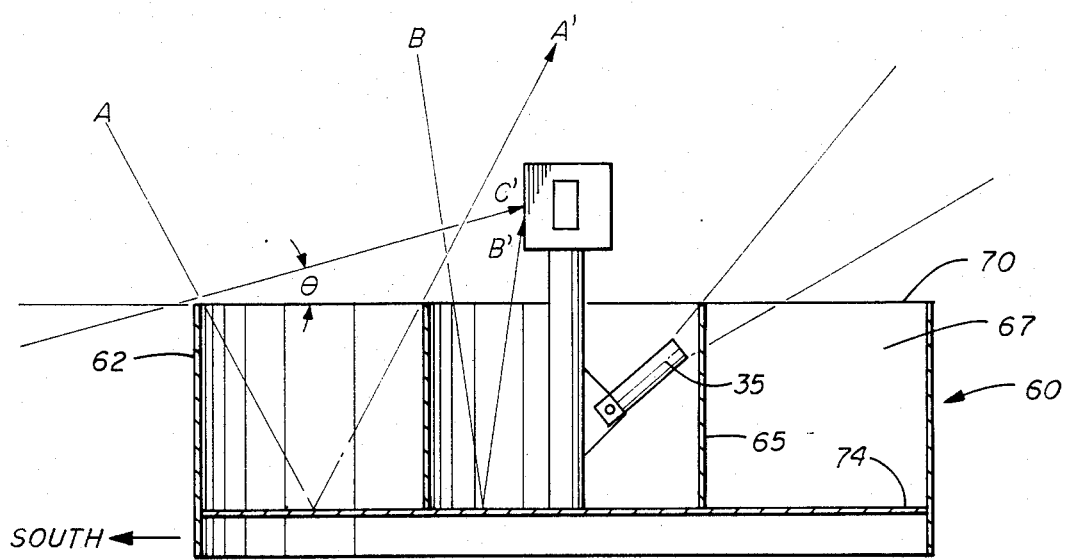
FIG. 6 is a somewhat schematic cross-sectional illustration of the baffle assembly taken generally on line 6—6 in FIG. 5.

With reference to FIGS. 5 and 6, a circular enclosure 60 is shown for even better control of light reflection from the surface. Enclosure 60 substantially horizontally surrounds cube 15, just below the cube. The enclosure has an outer wall 62, an inner wall 65, an open interior 67, and an open top 70. Enclosure 60 can be fabricated of metal or plastic sheet material, and the interior is painted a flat black. Preferably the vertical dimensions of the silicon cells are small compared to the outer diameter of wall 62, the height of the cells above the top of the enclosure 60 is small compared to this outer diameter, and the depth is about one half the radius. Also, the diameter of the inner wall 65 is considerably less than that of the outer wall 62. An opening 72 may be provided in inner wall 65 for a Z2 cell tube 35, if desired.

Enclosure 60 traps the sun's reflected rays at most angles of incidence, preventing reflection onto cube 15. The multiple walls 62 and 65 shield the cube from rays striking the bottom horizontal surface of the enclosure, such as ray A—A'. Rays at very high angles with the horizon, such as ray B—B', strike the cell at a very high angle of incidence and therefore have little effect. A ray such as ray C—C', reflected for example from the surface below the horizon of enclosure 60, can reach the cells, but this can occur only at very low sun angles.

As described earlier, one of the cells of the X-pair and one of the cells of the Y-pair will always be shadowed. That is, as the sun moves across the sky, it will strike one of the cells of a given pair at one time of the day, and may strike the other at another time of the day, but clearly cannot strike both cells of a given pair at the same time. In FIG. 2, for example, cell Y2 would be shadowed in the morning, cell Y1 in the afternoon, and, when north of the Tropic of Cancer (23° 27' latitude), cell X2 would always be shadowed in the winter, and shadowed at least at high noon in the summer. Therefore, another embodiment contemplated by the present invention involves but five cells, such as X1, X2, Y1, Y2, and Z1. In this case, rather than connecting the outputs of the cell pairs in electrical oppositon, each cell is connected individually and directly to an electronic circuit, such as a digital calculator similar to calculator 45. The calculator then picks out the lowest two of the five signals from the cells and sums these values to provide the sixth signal, which is equivalent to that provided previously by cell Z2.

That this is equivalent to the signal previously provided by cell Z2 is clear once it is understood, as can be seen from the discussion above, that no more than three sides of a cube can be illuminated at once by the direct rays of the sun. The remaining two (shadowed) cells each look at one half of the sphere of the sky. Thus the sum of the signals from the two shadowed cells is the total of the hemispherical diffuse radiation, which is exactly the signal needed for subtraction from the sensor on the top (cell Z1). Thus, in this embodiment, the sixth cell (i.e., cell Z2) can be eliminated, making for even greater simplicity.

It will also be appreciated that, at least under certain circumstances and depending upon the application, it would be possible to make satisfactory measurements utilizing photocells in just two planes. The planes need not even be at right angles with respect to each other, although the geometric resolution of the resultant value of the sun's direct rays becomes more involved with such a non-orthogonal configuration. At high noon (and all day long during either the vernal or autumnal equinox), for example, if cube 15 is rotated to the same angle as described for the shadow band 25, two direct-measurement cells in two planes, and appropriate corresponding diffuse light measurements, will suffice. (Of course, if a plane is rotated "upwardly", its "back" or "rear" side may then face partly downwardly. Naturally, if desired, and depending upon the application, the corresponding diffuse measurement may then be made by suitably adapting one of the Z-axis diffuse measurement techniques taught above.)

As may be seen, therefore, the present invention provides numerous advantages. Principally, it provides an uncomplicated, inexpensive, and reliable method and apparatus which can accurately measure the value of the intensity of the direct rays of the sun without requiring tracking. It thus requires no power for tracking. It has a minimum of parts, none of which have to be moving. It is extremely versatile, suited for the widest possible applications, such as extended, unattended use, as in remote sites where tracking power is unavailable.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:
1. A direct ray solar meter for measuring the intensity of the direct rays of the sun, comprising:
   (a) two pairs of silicon cells, each pair parallel to a plane substantially perpendicular to the other pair, and also substantially perpendicular to the earth's surface where they are located, the cells in each pair facing in opposite directions for independently measuring the light incident on each side of said two planes,
   (b) a fifth silicon cell facing substantially away from the earth and being substantially parallel to a third plane which is substantially parallel to the earth's surface and substantially perpendicular to both said planes of said two pairs of cells for measuring the light downwardly incident on said third plane,
   (c) means defining an interiorly blackened tube having one end open and pointing toward a portion of the sky from which the sun does not shine while the direct rays of the sun are being measured,
   (d) a sixth silicon cell located within said tube and facing toward said open end thereof for measuring only the diffuse radiation incident on said third plane, said fifth and sixth cells forming a third pair of silicon cells,
   (e) means defining an enclosure substantially horizontally surrounding and just below said first two pairs of silicon cells, said enclosure having an outer wall, an inner wall, an open interior, and an open top, said outer wall having a lateral extent substantially greater than the depth of said enclosure, said inner wall having a lateral extent substantially less than that of said outer wall, and the open interior thereof being flat black, for controlling reflection of light onto said silicon cells,
   (f) means connected to said three pairs of silicon cells for determining the values of the differences of the respective pairs of measurements of light incident on each of said three planes, and

(g) means for determining the value of the direct rays of the sun by determining the square root of the sum of the squares of said three difference values.

2. A method for measuring the intensity of the direct rays of the sun, comprising:

independently measuring the light incident on each side of two substantially mutually perpendicular planes both substantially perpendicular to the earth's surface at the location of the measurement, shielding said planes from reflected radiation from the earth's surface, measuring the light downwardly incident on a third plane substantially parallel to the earth's surface at the location of the measurement, measuring only the diffuse radiation incident on the third plane, determining the values of the differences of the respective pairs of measurements made on each of the three planes, and determining the value of the direct rays by determining the square root of the sum of the squares of the three difference values.

3. The method of claim 2 wherein said measuring steps further comprise measuring with two pairs of silicon cells oriented parallel to the planes which are substantially perpendicular to the earth's surface at the location of the measurement, and with the cells in each of the pairs facing in opposite directions, orienting a cell for the third plane substantially parallel to the earth's surface, substantially perpendicular to both the planes of the two pairs of cells, and facing substantially away from the earth, and determining substantially the total hemispherical diffuse radiation by substantially summing each of the lower cell outputs from each of the two pairs of cells.

4. The method of claim 2 wherein said measuring steps further comprise measuring with three pairs of silicon cells by orienting each of the first two pairs parallel to a plane substantially perpendicular to the other pair, and also substantially perpendicular to the earth's surface at the location of the measurement, and with the cells in each of the first two pairs facing in opposite directions, orienting the first cell of the third pair substantially parallel to the earth's surface, substantially perpendicular to both the planes of the first two pairs, and facing substantially away from the earth, and orienting the second cell of the third pair to be exposed to portions of the sky from which the sun does not shine while the direct rays of the sun are being measured.

5. A method for measuring the intensity of the direct rays of the sun, comprising:

(a) independently measuring the light incident on each side of two substantially perpendicular planes using two pairs of silicon cells, the cells in each pair facing in opposite directions, each pair being parallel to one of the planes and substantially perpendicular to the other pair, and the planes and silicon cells also being substantially perpendicular to the earth's surface where they are located, (b) measuring the light downwardly incident on a third plane which is substantially parallel to the earth's surface, and substantially perpendicular to both the planes of the two pairs of cells, with a fifth silicon cell substantially parallel to the third plane and facing substantially away from the earth, (c) pointing the open end of an interiorly blackened tube toward a portion of the sky from which the sun does not shine while the direct rays of the sun are being measured, (d) measuring only the diffuse radiation incident on the third plane using a sixth silicon cell located within the tube and facing toward the open end thereof, the fifth and sixth cells forming a third pair of silicon cells, (e) controlling reflection of light onto the silicon cells by substantially horizontally surrounding the first two pairs of silicon cells with an enclosure located just below the first two pairs, the enclosure having an outer wall, an inner wall, an open interior, and an open top, the outer wall having a lateral extent substantially greater than the depth of the enclosure, the inner wall having a lateral extent substantially less than that of the outer wall, and the open interior thereof being flat black, (f) determining the values of the differences of the respective measurements of light incident on each of the three pairs of silicon cells, and (g) determining the value of the direct rays of the sun by determining the square root of the sum of the squares of the three difference values.

6. A direct ray solar meter for measuring the intensity of the direct rays of the sun, comprising:

a first pair of oppositely facing parallel photocells mounted substantially perpendicular to the earth's surface for measuring direct and diffuse light energy, a second pair of oppositely facing parallel photocells mounted orthogonal to said first pair and substantially perpendicular to the earth's surface, means for shielding said first and second pairs of photocells from reflected energy from the ground;

a fifth photocell mounted orthogonal to said first and second pairs which is substantially parallel to the earth's surface for measuring direct and diffuse light energy on a plane parallel to the earth's surface, means for measuring diffuse light energy on the plane parallel to the earth's surface, means for determining the value of direct light energy on a plane parallel to said first pair of photocells by subtracting the light energy values measured by each photocell of said first pair, means for determining the value of direct light energy on a plane parallel to said second pair of photocells by subtracting the light energy values measured by each photocell of said second pair, and means for determining the value of direct light energy on a plane parallel to the earth's surface by subtracting the reading of diffuse light energy from the value of direct and diffuse light energy measured by said fifth photocell.

7. A direct ray solar meter according to claim 6 wherein said means for measuring the diffuse energy on said plane parallel to the earth's surface includes a sixth photocell mounted on a plane parallel to the earth's surface with an adjustable shadow band mounted over said sixth photocell which effectively blocks direct sunlight from impinging on said light sensor while permitting diffuse light to impinge on said light sensor.

8. A direct ray solar meter according to claim 6 wherein the said means for measuring diffuse energy in said plane parallel to the earth's surface comprises:

a light sensor mounted within a hollow tube, said tube positioned relative to the sun such that no direct sunlight impinges on said light sensor within said tube while diffuse light energy is permitted to impinge on said light sensor within said tube.

9. A direct ray solar meter according to claim 6 wherein:
said means for measuring diffuse energy in said plane parallel to the earth's surface includes means for summing each of the lower cell outputs from each of said first and second pairs of cells.

10. A direct ray solar meter for measuring the intensity of the direct rays of the sun, comprising:
(a) first means for independently measuring the light incident on each side of two substantially mutually perpendicular planes both substantially perpendicular to the earth's surface at the location of the measurement,
(b) second means for measuring the light downwardly incident on a third plane substantially parallel to the earth's surface at the location of the measurement,
(c) third means for measuring only the diffuse radiation incident on said third plane, said third means including means for determining substantially the total hemispherical diffuse radiation by substantially summing each of the lower outputs from each pair of cells in said first means;
(d) means connected to said first, second, and third means for measuring for determining the values of the differences of the respective pairs of measurements made on each of said three planes, and
(e) means for determining the value of the direct rays by determining the square root of the sum of the squares of said three difference values.

* * * * *